United States Patent [19]

Schick

[11] Patent Number: 5,544,801
[45] Date of Patent: Aug. 13, 1996

[54] FASTENING DEVICE FOR BELT CONNECTORS

[75] Inventor: Jean-François Schick, Monteferrier/Lez, France

[73] Assignee: Goro S.A., Saint Privat des Vieux, France

[21] Appl. No.: 412,324

[22] Filed: Mar. 31, 1995

[30] Foreign Application Priority Data

Apr. 23, 1994 [DE] Germany .......................... 44 14 262.5

[51] Int. Cl.$^6$ ................. F16G 3/16; F16G 3/04
[52] U.S. Cl. .................. 227/110; 227/143; 227/155; 29/243.51; 74/89.15
[58] Field of Search ................. 227/20, 26, 31, 227/32, 33, 34, 110, 111, 112, 131, 143, 147, 154, 155; 29/243.51; 74/89.15; 403/323, 326, 328

[56] References Cited

U.S. PATENT DOCUMENTS

| | | | |
|---|---|---|---|
| 3,458,099 | 7/1969 | Schick | 227/111 |
| 4,144,628 | 3/1979 | Schick | 29/243.51 |
| 4,440,336 | 4/1984 | Kifor | 227/111 X |
| 4,688,711 | 8/1987 | Gladding et al. | 227/147 |
| 4,789,092 | 12/1988 | Schick | 227/111 |
| 5,170,924 | 12/1992 | Musil | 227/111 |
| 5,238,169 | 8/1993 | Herold | 227/147 |
| 5,368,214 | 11/1994 | Schick | 227/147 |

Primary Examiner—Scott A. Smith
Assistant Examiner—Jay A. Stelacone
Attorney, Agent, or Firm—Herbert Dubno

[57] ABSTRACT

An apparatus for stapling a belt-connecting clip fitted to a belt end has a crimping die, a housing fixable relative to the crimping die and forming a vertical guide, and a hold-down device engageable with the clip on the belt end on the crimping die, having an outer guide ring vertically slidable in the housing, and forming a vertically throughgoing guide bore adapted to hold staples engageable through the clip and belt end on the crimping die. A penetrating die has an extension projecting vertically downward through the guide bore and engageable with the staples therein. A spindle/nut mechanism in the housing can vertically displace the penetrating die between an upper position with its extension above and out of contact with the staples, clip, and belt end and a lower position engaged down on the staples and forcing same through the clip and belt end and against the crimping die. A ball coupling between the hold-down device and the penetrating die pushes down the hold-down device and penetrating die until the hold-down device is urged upward with a force exceeding a specific contact force and thereafter only pushes down the penetrating die. Thus the hold-down device will move downward with the penetrating die until the hold-down device engages and clamps the clip and belt end to the crimping die and thereafter the penetrating die alone moves downward to drive the staples through the clip and belt end and against the crimping die.

8 Claims, 10 Drawing Sheets

FASTENING DEVICE FOR BELT CONNECTORS

FILED OF THE INVENTION

The invention refers to a-fastening device for belt connectors consisting of a number of connecting clips arranged in series on conveyor belt ends, including at least one bending die to position the connecting clips and a pressure head to be centered in relation to the bending die and including a penetrating die which can be pressed down against the bending die to fasten staples which can be inserted by means of the penetrating die through the connecting clips, penetrating the belt end inserted between the connecting clips.

BACKGROUND OF THE INVENTION

Such a fastening device, in which a penetrating die is driven by means of a chop hammer by a fitter, is known. Such manual insertion of fastening staples is often inadequate due to the hammering force being irregular. If the hammering force is excessive, there is a risk that the fastening staples are inserted too deeply into the belt ends, damaging the fastening clips and/or their legs or even fracturing them. Another problem can be seen in the fact that the pressure head could pop up under excessive hammering of the penetrating dies due to bouncing back, leading to projection of the fastening staples from the belt ends, being neither hammered nor penetrating the belt ends to a sufficient depth and not accurately enough. Moreover, even damage of the pressure head cannot be excluded as the hammer will not always be driven exactly vertically unto the penetrating die but may hit it obliquely, with the hammer hitting the pressure head at the same time. Finally, difficulties could also occur when the fastening staples are to penetrate very thick belt ends.

OBJECTS OF THE INVENTION

The invention is based on the task of creating a fastening device for belt connectors consisting of a number of connecting clips arranged in series on conveyor belt ends of the embodiment described above, ensuring exact penetration of the fastening staples without damaging the connecting clips and the fastening staples themselves and without distorting the belt end in its aligned position and the connecting clips in a simple and efficient way.

SUMMARY OF THE INVENTION

An apparatus for stapling a belt-connecting clip fitted to a belt end according to the invention has a crimping die adapted to support the belt end over which is fitted the clip, a pressure-head housing fixable relative to the crimping die and having a lower section forming a vertical guide and an upper section, and a hold-down device having a lower end engageable with the clip on the belt end on the crimping die, having an outer guide ring vertically slidable in the housing, and forming a vertically throughgoing guide bore adapted to hold staples engageable through the clip and belt end on the crimping die. A penetrating die is vertically displaceable in the housing and having an extension projecting vertically downward through the guide bore and engageable with the staples therein. A spindle/nut mechanism in the upper housing section can vertically displace the penetrating die in the housing between an upper position with its extension above and out of contact with the staples, clip, and belt end and a lower position engaged down on the staples and forcing same through the clip and belt end and against the crimping die. A spring-mounted deep-groove ball coupling between the hold-down device and the penetrating die pushes down the hold-down device and penetrating die until the hold-down device is urged upward with a force exceeding a specific contact force and thereafter only pushes down the penetrating die. Thus the hold-down device will move downward with the penetrating die until the hold-down device engages and clamps the clip and belt end to the crimping die and thereafter the penetrating die alone moves downward to drive the staples through the clip and belt end and against the crimping die.

Other measures essential to the invention will be described in the following. The invention shows that the guide section or ring is surrounded by a concentric brake acting against the internal wall of the enclosure or housing, actuated after uncoupling of the penetrating die during axial travel to ensure that well-defined conditions always exist within the enclosure after the holding-down device has made contact and the penetrating die performs its movement in relation to the guide section and the holding-down device after uncoupling. According to a proposal of the invention, which is of independent importance, the top end of the penetrating die is designed as a spindle, surrounded by a spindle and nut mechanism to form a spindle and nut mechanism, that the spindle nut can be driven by means of a gear and that the gear includes a drive shaft projecting from the enclosure to which a manual screwing device, such as an electrical or pneumatic manual screwing device can be attached. The gear should preferably be a mechanism consisting of a pair of bevel wheels, with the spindle and nut mechanism being arranged co-axially and concentrically in one of the bevel wheels arranged in the enclosure, with the other bevel wheel being designed as a drive pinion including a hexagonal section acting as a drive shaft for the attachable manual screwing device. Furthermore, the invention provides that the penetrating die is designed with an annular groove to form a deep-groove ball coupling and is surrounded within the area of the annular groove by a coupling ring consisting of a radial ball bearing engaging into the annular groove, with the coupling ring being inserted into the guide section to ensure axial movement and supported on one side against an annular spring mechanism and on the other, within the area of the ball bearing is provided with a conical section matching the frusto conical shoulder of the guide section, with the ball being pressed into the annular groove of the penetrating die when the coupling ring is in basic position to couple with the annular groove of the penetrating die by a specific dimension and being capable of being pressed out and/or being pressed out due to a relative movement between the penetrating die and/or the coupling ring and the guide section by uncoupling the penetrating die from its annular groove. On the other hand the balls are returned under pressure into the annular groove by a specific dimension on upward return of the penetrating die to its basic position due to the coupling ring being pushed up by the annular spring mechanism, pressing the balls against the frusto conical shoulder of the guide section and moving them from there, depending on its conical shape, into the direction of the annular groove, finally leading to recoupling of the penetrating die with the coupling ring. Furthermore, the invention recommends that the guide section includes a ball bearing ring consisting of rotating balls within the area of the brake, which are pressed against the rotating and resettable spring-mounted brake sections by means of a conical shoulder of the coupling ring during a relative movement between the coupling ring and the guide section, pressing the brake sections and/or their linings against the internal wall of the enclosure ensuring more or less automatically uncoupling of the penetrating die on the one hand when being lowered and locking of the guide section in its appropriate position in the enclosure by means of the actuated brake on the other, ensuring a well-defined relative movement between the penetrating die and the die guide in order to insert fastening staples into the appropriate belt end. After upward movement of the penetrating die the balls are reset to their basic position by the resettable spring-mounted brake sections, cancelling their braking effect, ensuring that finally the die guide and/or the guide section and the holding-down device are returning upwards into their basic positions together with the penetrating die.

The fastening device according to the invention includes a slide on the bending die travelling in longitudinal direction, with the pressure head being hinged from the slide to the bending die and being provided with a handle. According to one proposal of the invention, which is of independent importance, the handle is designed as a bow-type handle hinged on both sides of the enclosure for the pressure head and mainly arranged in vertical direction, with mainly horizontal slot guides being arranged on both sides of the enclosure provided for locking slides arranged in the slot guides, with the legs of the bow-type handle being hinged to the front end of the locking slides with a specific play, the slot guides and he locking slides including mainly vertical break-outs for the penetration of locking hooks projecting from the slide, with the locking nose being engaged into locking hooks by the retracted locking slides when the pressure head is in operating position and the bow-type handle is pivoted forward. This will provide correct positioning and securing of the pressure head in operating position, achieving a maximum transfer of pressure and well-defined penetration of the fastening staples through the connecting clips into the belt end in question whilst the penetrating die is driven by a manual screwing device by the gear and the spindle and nut mechanism. The motor output of the manual screwing device is again dependent on the required torque and/or pressure. In order to achieve the play required for the hinge between the bow-type handle and the locking slides, the locking slides may be provided with hinged spigots engaging into essentially vertical slots in the legs of the bow of the bow-type handle. This is a way of providing a rather simple universal joint.

BRIEF DESCRIPTION OF THE DRAWINGS

In the following the invention will be described by only one drawing showing an embodiment of the invention, where.

SPECIFIC DESCRIPTION

The figures show a fastening device for belt connectors consisting of a series of connecting clips 1 arranged on conveyor belt ends 2. The basic design of this fastening device includes at least one crumping or bending die 3 for positioning the fastening clips 1 and a pressure head 4 to be centred with reference to the bending die 3 including a penetrating die 5 pressable against the bending die 3 for fastening staples 6 which can be inserted by means of the penetrating die 5 through the connecting clips 1, penetrating the belt end 2 inserted between the connecting clips 1. The pressure head 4 consists of an enclosure or housing 7 including a spindle and nut mechanism 8 for the penetrating die in the upper section of the enclosure and a die guide 9 in the bottom section of the enclosure. The die guide 9 includes a guide section 10 and a holding-down device 11 for appropriate connecting clips 1 projecting through the bottom of the enclosure which can be lifted and lowered. The penetrating die 5 is actuated by means of a spring-mounted deep-groove ball coupling 12 with the guide section 10 engaging into a continuous guide bore 14 of the holding-down device 11 by a die extension 13. The section of the guide bore 14 and therefore of the die extension 13 offset against the penetrating die 5 has been selected in such a way that the fastening staples 6 positioned on the legs of the connecting clips 1 can penetrate into the guide bore 14 when the holding-down device 11 is lowered, therefore being accurately inserted by the die extension 13 into the connecting clips 1 and/or their legs and the belt end by lowering of the penetrating die 5. The penetrating die 5 driven by the spindle and nut mechanism 8 will initially drive the guide section 10 together with the holding-down device 11 axially downward and will uncouple after the holding-down device 11 contacts the appropriate connecting clips 1 and after exceeding a specific pressure. After uncoupling, the penetrating die 5 will move axially downward in the guide section 10 and the holding-down device 11, with the extension of the die 13 inserting the appropriate fastening staples 6. The guide section 10 is concentrically surrounded by a brake 15, acting against the internal-wall of the enclosure, actuated after uncoupling of the penetrating die during axial travel, i.e. locking the guide section 10 against the internal wall of the enclosure. The top end of the penetrating die 5 is designed as a spindle 16 to form the spindle and nut mechanism 8 and is surrounded by a spindle nut 17. The spindle nut 17 can be driven by means of a gear 18. The gear 18 includes a drive shaft 19 projecting from the enclosure 7 to which an electrically or pneumatically driven screwing device can be attached. The gearing 18 consists of a pair of bevel wheels with one bevel wheel 20 arranged in the enclosure 7 coaxially and concentrically on the spindle nut 17 with the other bevel wheel 21 being designed as a drive pinion including a hexagonal section acting as a drive shaft 19. A spring-mounted support 22 is provided for the bevel wheel 20 including the spindle nut 17.

Figure 4:
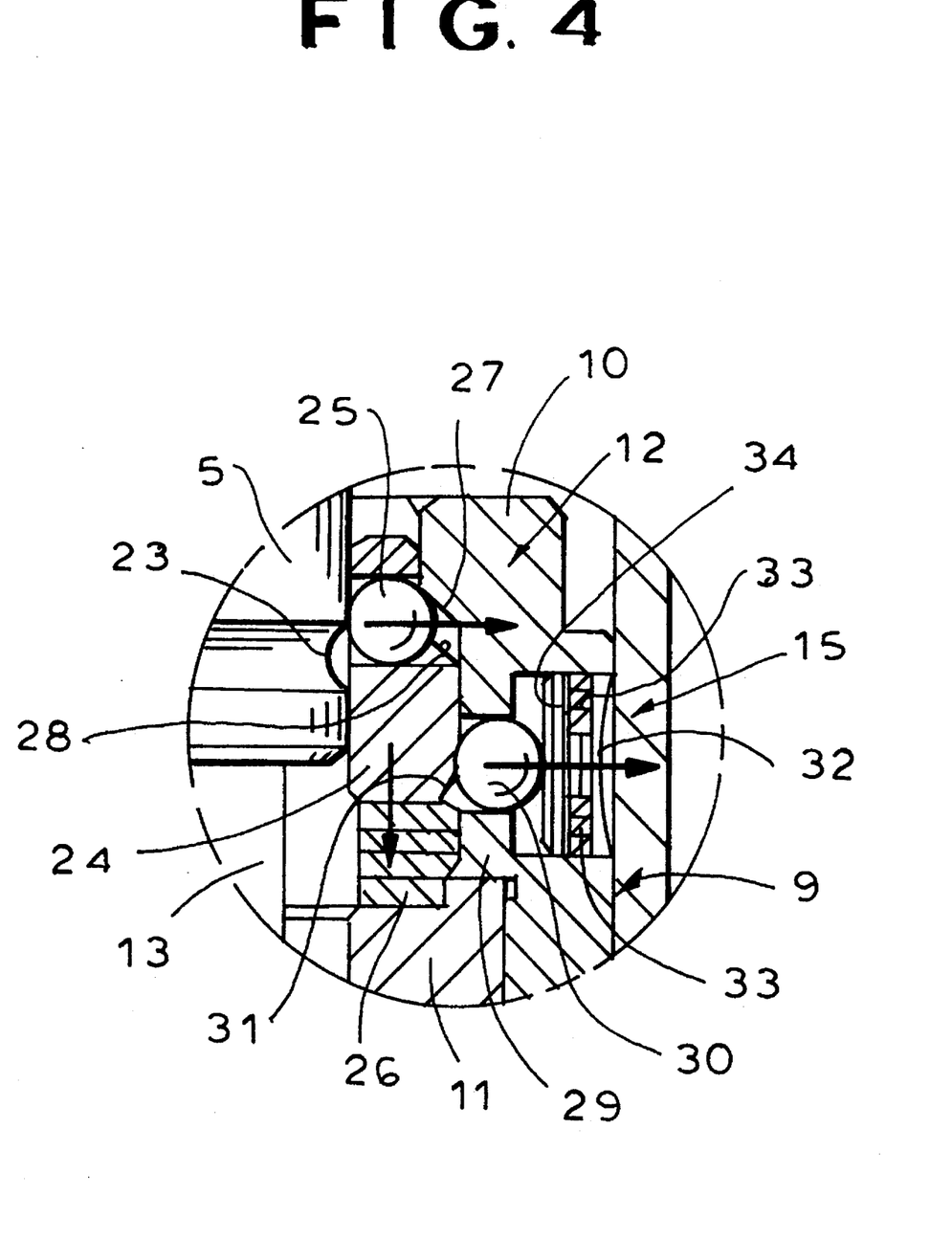
FIG. 4 is a detail of FIG. 3 with the directions of travel of the coupling ring and the balls for the coupling and the brake when the penetrating die is lowered indicated by arrows.

The penetrating die 5 includes an annular groove 23 to form the deep-groove ball coupling 12 and is surrounded within the area of the annular groove 23 by a coupling ring 24 including rotating balls 25 engaging into the annular groove 23. The coupling ring 24 is guided by the guide section 10 and travels in axial direction, supported on one side by an annular spring 26 and including as shown in FIG. 4, a frustoconical section 28 on the other within the area of the enclosed balls 25 matching a frusto conical shoulder 27 of the guide section 10. In this way the balls 25 are pressed into the annular groove 23 of the penetrating die 5 by a specific dimension when the coupling ring 24 is in its basic position in order to effect coupling, being pressed out due to a relative movement between the penetrating die 5 and/or the coupling ring 24 and the guide section 10 while uncoupling the penetrating die 5 from its annular groove 23. When the penetrating die returns upward, the balls 25 are pushed upward by the compressed and relaxing annular spring 26 to be pressed back by the slope of the conical shoulder 27 of the guide section 10 by a specific dimension into the annular groove 23 of the penetrating die 5, followed by coupling the penetrating die 5 again with the coupling ring 24 and therefore the guide section 10.

The guide section 10 includes a ball bearing ring 24 within the area of the brake 15, including rotating balls 30 mounted in a ring part 29 and pressed against rotating and resettable spring-mounted brake sections or pads 32 during a relative movement between the coupling ring 24 and the guide section 10 by means of a frusto conical shoulder 31 of the coupling ring 24, pushing the brake sections 32 and/or their linings against the internal wall of the enclosure, thus locking the guide section 10 in the housing 7. In order reset elastically, the brake sections 32 include spring mechanisms 33 acting in radial direction, consisting of a plastic such as polyurethane, in which a pressure plate 34 co-acting with the balls 30 is provided.

Figure 1:
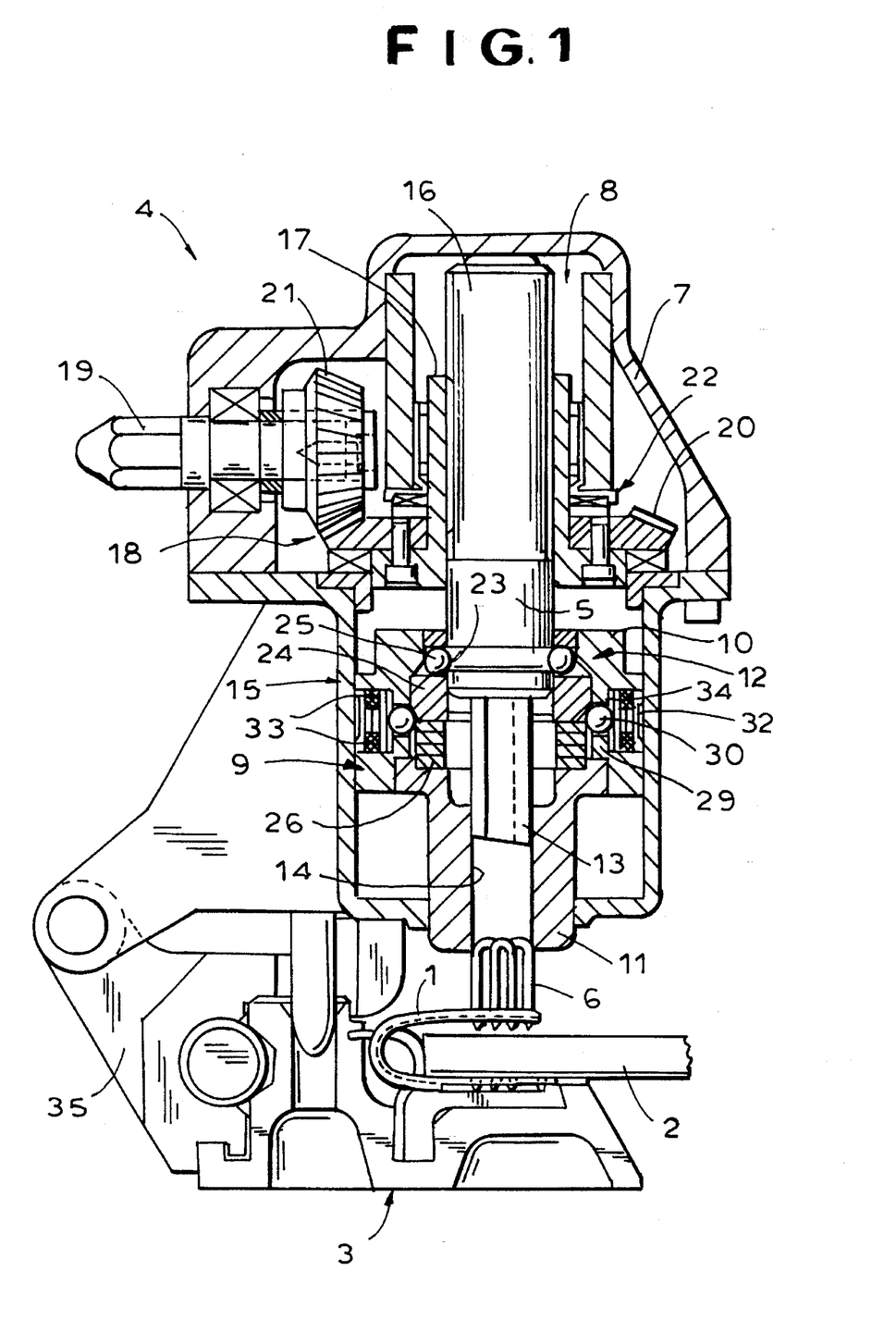
FIG. 1 is a partial vertical section of the fastening device of the invention in basic or starting position.
Figure 2:
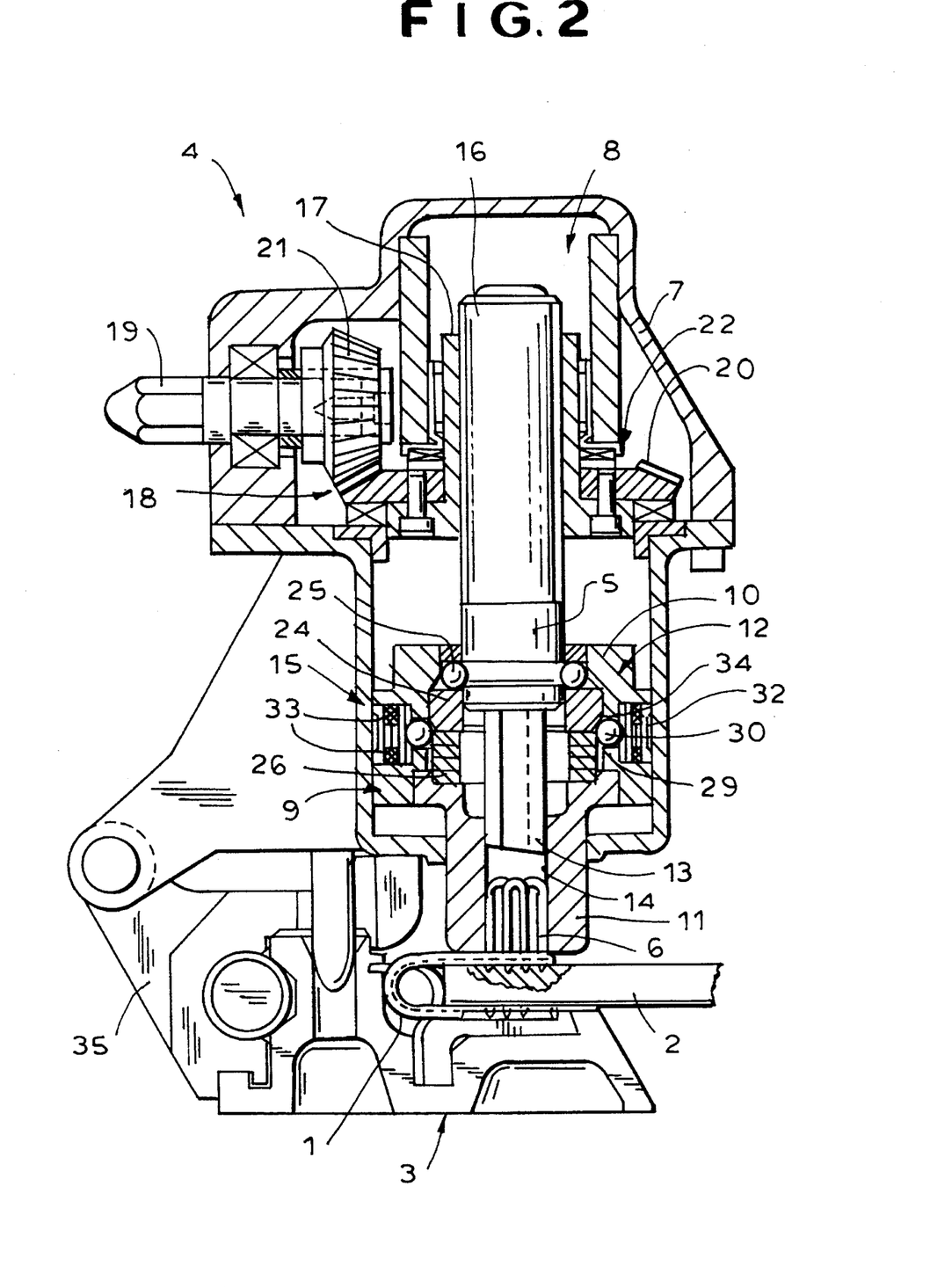
FIG. 2 is the object of FIG. 1 after lowering of the holding-down device.
Figure 3:
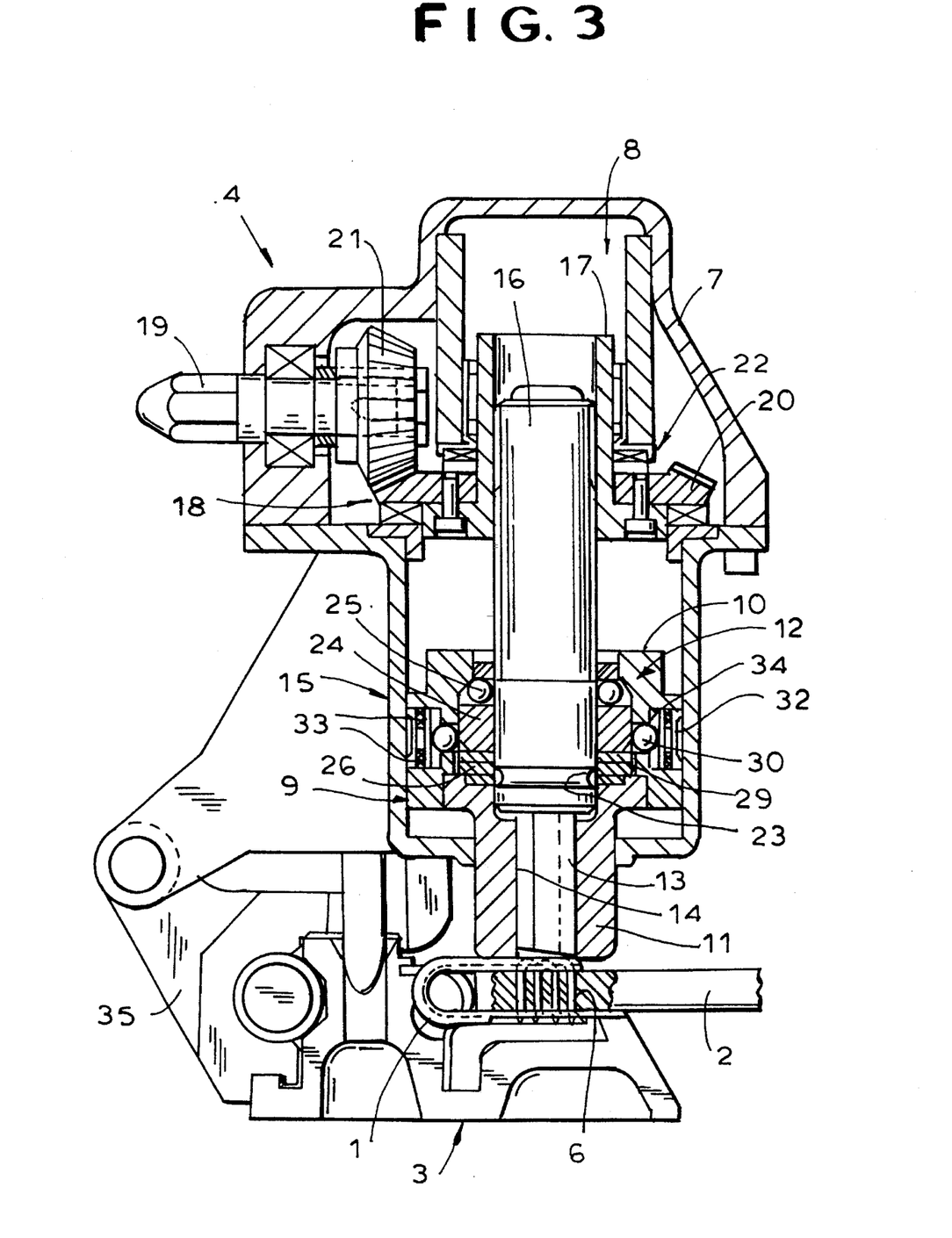
FIG. 3 is the object of FIG. 2 after inserting the fastening staples.
Figure 5:
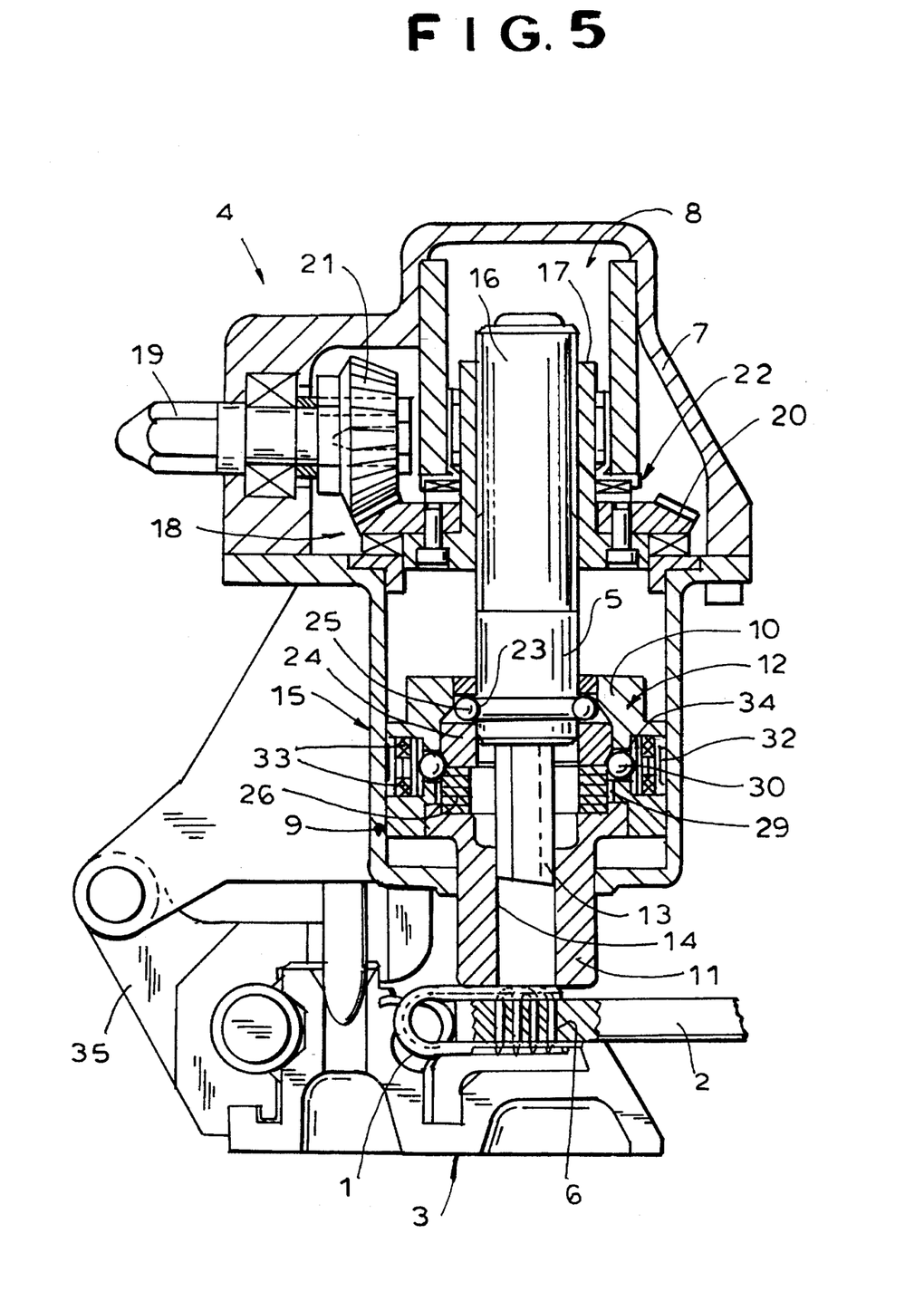
FIG. 5 is the object in accordance with FIG. 3 with the penetrating die partially returned after inserting the fastening staples.
Figure 6:
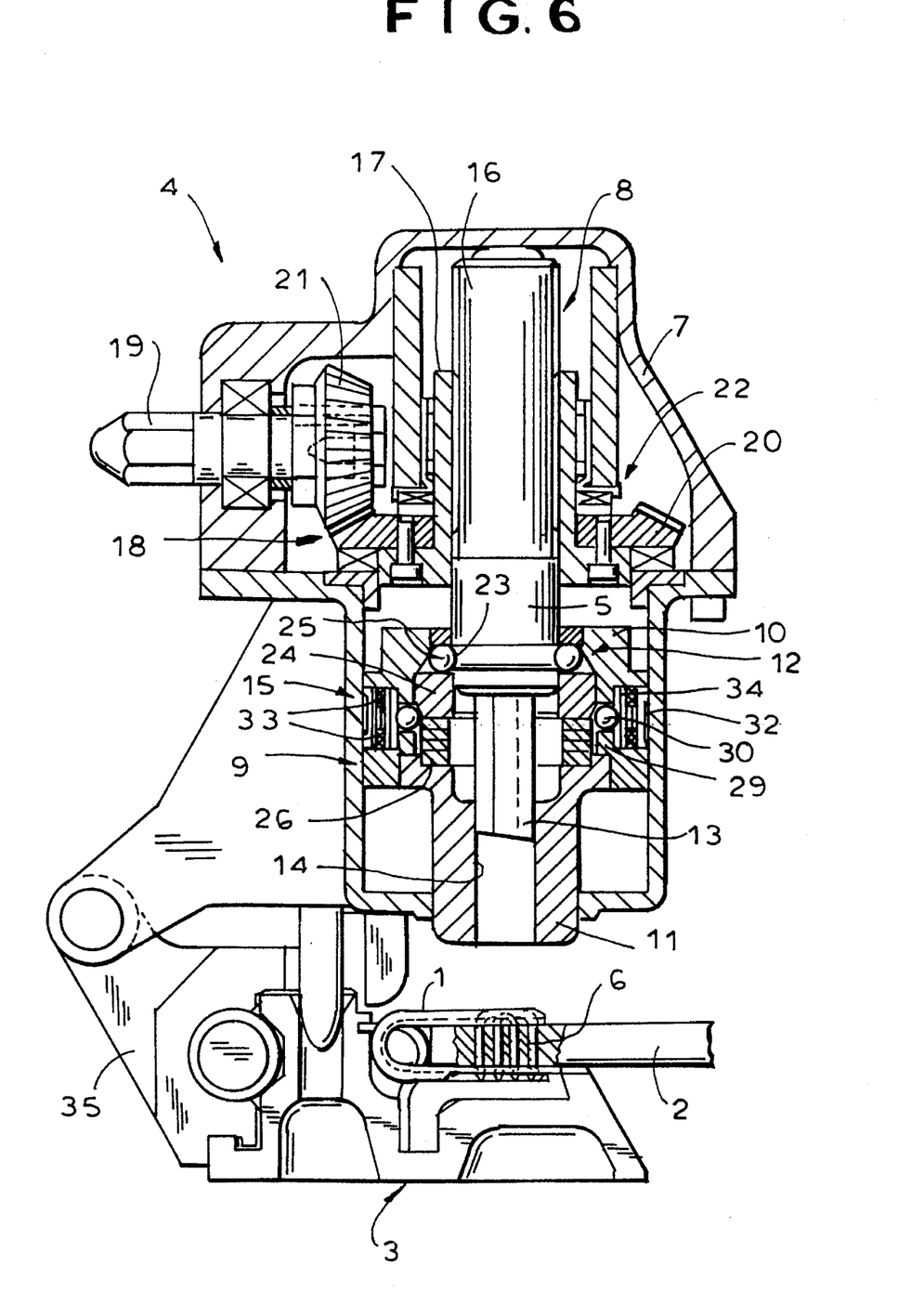
FIG. 6 is an object according to FIG. 1 including the penetrating die and the holding-down device returned to the starting or basic position.
Figure 7:
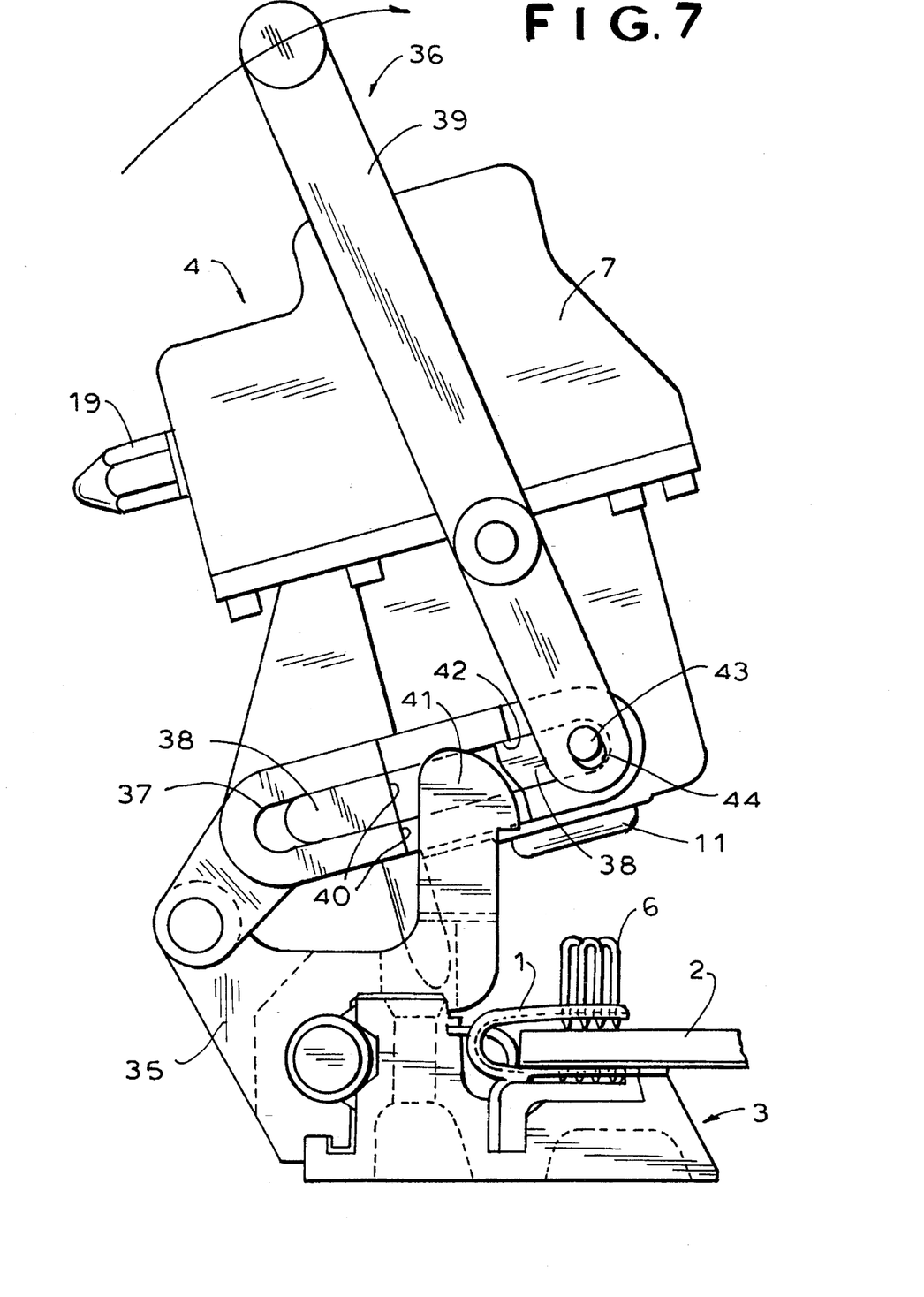
FIG. 7 is a diagrammatic side view of the fastening device according to the invention, with the pivoting direction indicated by an arrow.
Figure 8:
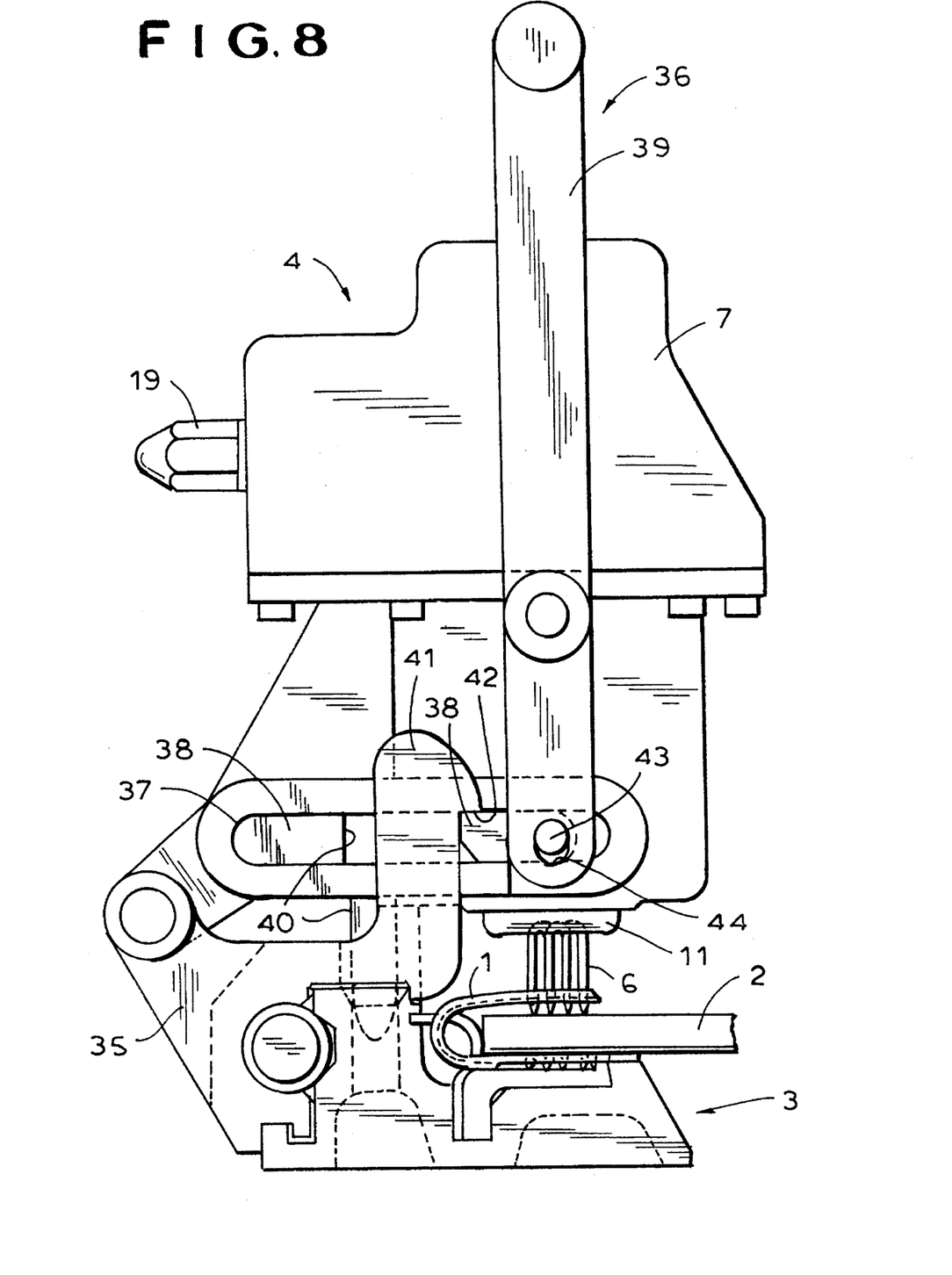
FIG. 8 is the object in accordance with FIG. 7 including a pressure head pivoted into operating position and a bow-type handle.
Figure 9:
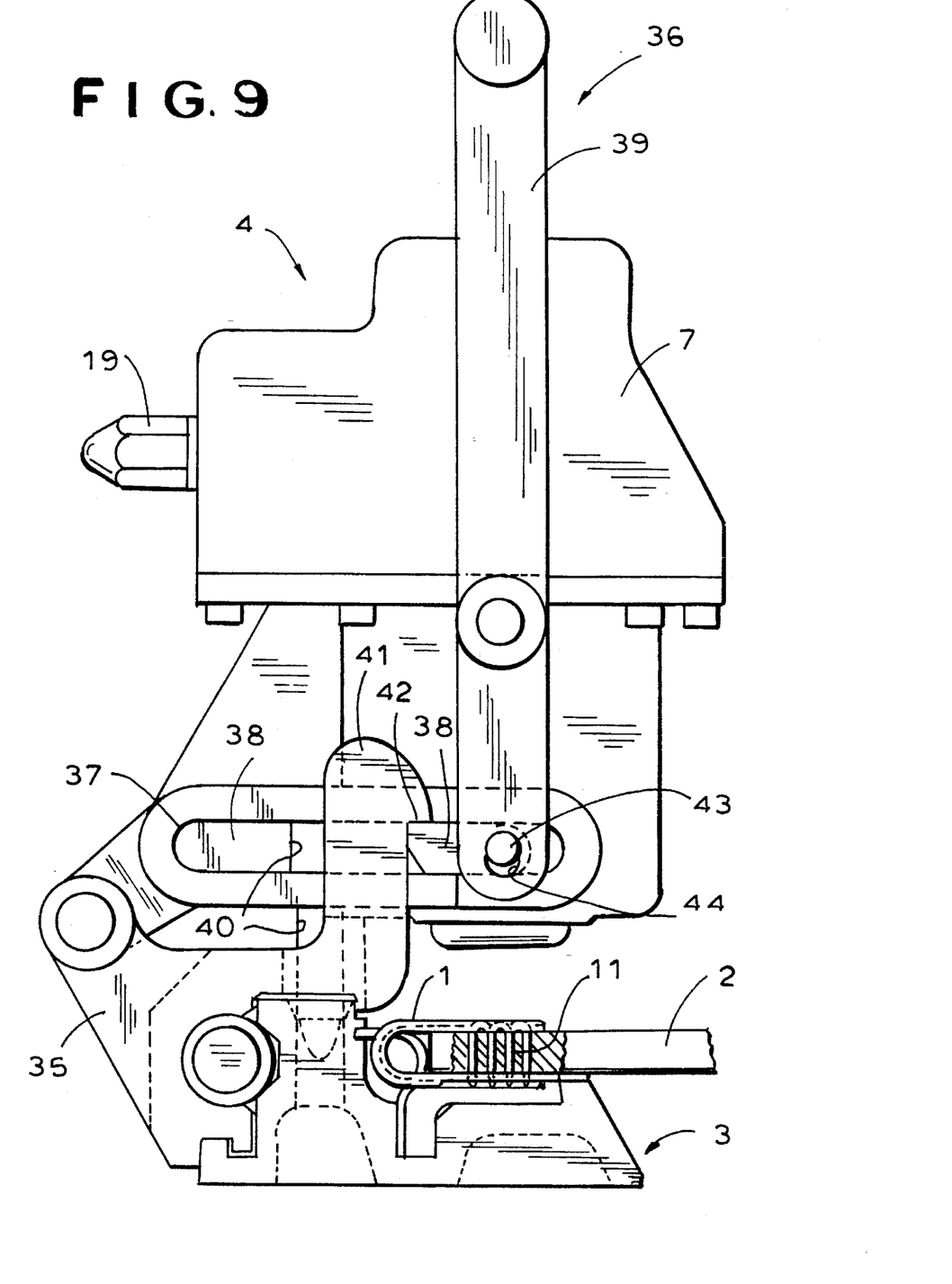
FIG. 9 is the object in accordance with FIG. 8 after driving in the fastening staples and FIG. 10 is the object in accordance with FIG. 9 while returning the pressure head to its basic position, with the pivoting direction of the bow-type handle and the direction of travel of the locking slides being indicated by arrows.
Figure 10:
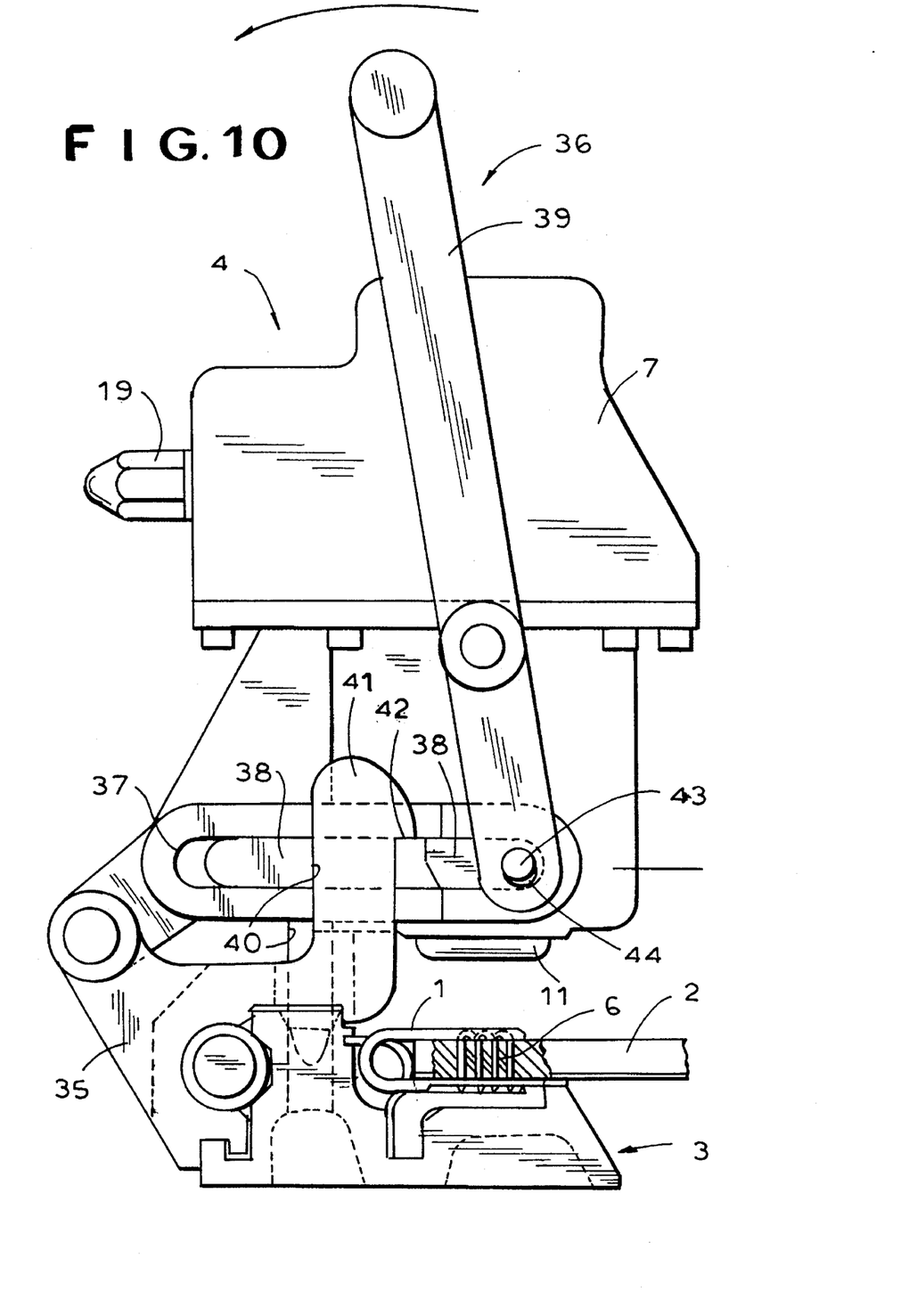

The mode of operation of the fastening device according to the invention can be easily seen from FIGS. 1 to 6. Starting from basic position according to FIG. 1, a penetrating die 5 including a guide section 10 and a holding-down device 11 is initially lowered by rotation of the spindle and nut mechanism 8, until the holding-down device 11 of the appropriate connecting clips 1 has been pushed down on the belt end 2. Then the penetrating die 5 will uncouple while being lowered further, performing a movement in relation to the guide section 10, the coupling ring 24 and the holding-down device 11. At the same time, the guide section 11 is locked against the internal wall of the housing 7 by actuation of the brake 15. The fastening staples 6 are poked by lowering the penetrating die 5 and/or its die extension 13 through the connecting clips 1 into the belt end 2 as seen in FIG. 3. Then the spindle and nut mechanism 8 is rotated oppositely by the manual screwing device, lifting the penetration die 5, coupling it again with the guide section 10, releasing the brake 15 of the guide section 10 and driving the guide section 10 together with the holding-down device 11 by the penetrating die 5 until the penetrating die 5 and the guide section 10 together with the holding-down device 11 have returned to their basic position as seen in FIGS. 5 and 6.

The bending die 3 carries a slide 35 travelling longitudinally, with the pressure head 4 being pivoted from the slide 35 against a bending die 3 and including a handle 36. This ensures that the pressure head 4 travelling in longitudinal direction together with the slide 35 can insert the connecting clips 1 and/or the fastening staples 6 one by one in the top clip legs positioned over the belt end 2 by means of a driven penetrating die 5 through the legs of the clips and the belt end 2 in accurate alignment. The handle is designed as a bow-type handle 36 hinged on both sides on the enclosure 7 for the pressure head 4 and mainly arranged in vertical direction. A mainly horizontal slot guide 37 is arranged on the enclosure 7 for locking slides 38 travelling in the slot guides 37. The bow legs 39 of the bow-type handle 36 are hinged at the front ends of the locking slides 38 with a specific play. The slot guides 37 and the locking slides 38 include mainly vertical cut-outs 40 to accommodate locking hooks 41 projecting from the slide 35. When the pressure head 4 is in operating position and the bow-shaped handle 36 is pivoted forward, the locking hooks 41 each engage in the return locking slide 38 by means of a locking nose 42, with the pressure head being correctly positioned in order to correctly absorb any pressure created by the penetrating die 5 when inserting the fastening staples 6. In order to achieve the required play within the hinged area between the bow legs 39 and the locking slides 38, the locking slides 38 include pins 43 engaging into essentially vertical longitudinal slots 44 in the bow legs 39 of the bow-type handle 36. The pivoting movement during positioning of the pressure head 4 and the bow-type handle 36 to lock the pressure head 4 in operating position are all clearly shown in FIGS. 7 to 10, just as the release of the pressure head 4 by returning the bow-type handle 36 and pivoting the pressure head 4 back into its basic position by means of the bow-shaped handle 36.

I claim:

1. An apparatus for stapling a belt-connecting clip fitted to a belt end, the apparatus comprising:

a crimping die adapted to support the belt end over which is fitted the clip;

a pressure-head housing fixable relative to the crimping die and having a lower section forming a vertical guide and an upper section;

a hold-down device having a lower end engageable with the clip on the belt end on the crimping die, having an outer guide ring vertically slidable in the housing, and forming a vertically throughgoing guide bore adapted to hold staples engageable through the clip and belt end on the crimping die;

a penetrating die vertically displaceable in the housing and having an extension projecting vertically downward through the guide bore and engageable with the staples therein;

means including a spindle/nut mechanism in the upper housing section for vertically displacing the penetrating die in the housing between an upper position with its extension above and out of contact with the staples, clip, and belt end and a lower position engaged down on the staples and forcing same through the clip and belt end and against the crimping die; and means including a spring-mounted deep-groove ball coupling between the hold-down device and the penetrating die for joint downward movement of the hold-down device and penetrating die until the hold-down device is urged upward with a force exceeding a specific contact force and thereafter for downward travel only of the penetrating die, whereby the hold-down device will move downward with the penetrating die until the hold-down device engages and clamps the clip and belt end to the crimping die and thereafter the penetrating die alone moves downward to drive the staples through the clip and belt end and against the crimping die.

2. The belt-connecting stapling apparatus defined in claim 1, further comprising brake means associated with the coupling means and engageable between the hold-down device and the housing for locking the hold-down device in the housing when the hold-down device uncouples from the penetrating die.

3. The belt-connecting stapling apparatus defined in claim 2 wherein the brake means includes:

a frustoconical shoulder on the hold-down device, a plurality of brake pads engageable radially outward in the guide ring with the housing, a plurality of braking balls bearing axially against the frustoconical shoulder and radially outward against the brake pads, the hold-down device and guide ring being limitedly axially movable relative to each other.

4. The belt-connecting stapling apparatus defined in claim 1 wherein the spindle/nut mechanism includes a spindle formed on the penetrating die, a nut threaded on the spindle and rotatable in the housing, a gear fixed on the nut, another gear meshing with the gear on the nut, and a shaft projecting from the housing and fixed to the other gear for rotating same.

5. The belt-connecting stapling apparatus defined in claim 4 wherein the gears are bevel gears and the shaft has a polygonal section adapted to be engaged by a drive tool.

6. The belt-connecting stapling apparatus defined in claim 1 wherein the coupling includes a radially outwardly open groove on the penetrating die, a frustoconical shoulder on the hold-down device at the groove, and balls in the groove bearing against the shoulder and engageable in the grooves, the hold-down device including a coupling ring surrounding the penetrating die and forming a radially inwardly open groove generally level with the outwardly open groove of the penetrating die, and spring means permitting limited relative axial movement of the coupling ring relative to the hold-down device for camming the balls out of the outwardly open groove on compression of the spring means by engagement of the hold-down device with the belt end and clip on the crimping die.

7. The belt-connecting stapling apparatus defined in claim 1, further comprising a longitudinally displaceable carriage supporting the housing for longitudinal movement on the penetrating die;

an upwardly projecting handle limitedly pivotal on the housing;

a slide longitudinally displaceable in the housing between end positions and formed with a throughgoing cutout;

a pivot supporting the housing on the slide for pivoting about a transverse axis;

at least one hook on the penetrating die engageable through the cutout; and means coupling the handle to the slide for displacing same under the hook in one end position of the slide.

8. The belt-connecting stapling apparatus defined in claim 7 wherein the coupling means between the handle and the slide includes a horizontally projecting pin on the slide and a vertically elongated slot on the handle.

* * * * *